(12) United States Patent
Rogers et al.

(10) Patent No.: US 12,300,084 B2
(45) Date of Patent: *May 13, 2025

(54) METHOD, SYSTEM, AND DEVICE FOR PROTECTING VEHICLE OCCUPANTS

(71) Applicant: Lives Matter, Inc., New Bedford, MA (US)

(72) Inventors: Susan Rogers, New Bedford, MA (US); Shane McKenna, Salt Lake City, UT (US); Orlin Max Wetzker, Ogden, UT (US)

(73) Assignee: LIVES MATTER, INC., New Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,881

(22) Filed: Aug. 31, 2022

(65) Prior Publication Data

US 2024/0073667 A1 Feb. 29, 2024

Related U.S. Application Data

(63) Continuation of application No. 17/020,582, filed on Sep. 14, 2020, now Pat. No. 11,462,093, which is a (Continued)

(51) Int. Cl.
*G08B 21/02* (2006.01)
*B60N 2/00* (2006.01)
(Continued)

(52) U.S. Cl.
CPC ......... *G08B 21/028* (2013.01); *B60N 2/0026* (2023.08); *G08B 21/0222* (2013.01); (Continued)

(58) Field of Classification Search
CPC ............ G08B 21/0222; G08B 21/0225; G08B 21/0266; G08B 21/028; G08B 21/22; (Continued)

(56) References Cited

U.S. PATENT DOCUMENTS 5,949,340 A 9/1999 Rossi
6,922,147 B1 7/2005 Viksnins et al.
(Continued)

*Primary Examiner* — Omer S Khan
(74) *Attorney, Agent, or Firm* — Jason P. Webb; Pearson Butler

(57) ABSTRACT

A system, method, and device for protecting a vehicle occupant over a computerized network. There is an electronic seat pad with an occupant sensor, a driver sensor control module that detects proximity a driver's portable electronic computing device relative to the vehicle; and a key-location sensor that detects proximity of a vehicle key to the vehicle. There is a system management module that determines alert statuses and sends alert and safety notifications to a remote notification device, which automatically registers an alert if a threshold level of safety notifications are not received. There may be pressure, temperature, signal strength, CO2, IR, and other sensors. There is a state library that may be updated to identify additional dangerous states based on sensor readings.

20 Claims, 11 Drawing Sheets

Related U.S. Application Data continuation of application No. 15/808,672, filed on Nov. 9, 2017, now Pat. No. 10,810,853.

(60) Provisional application No. 62/419,533, filed on Nov. 9, 2016.

(51) Int. Cl.

| | | |
|---|---|---|
| *B60N 2/26* | (2006.01) | |
| *G08B 21/22* | (2006.01) | |
| *G08B 25/00* | (2006.01) | |
| *G08B 25/10* | (2006.01) | |
| *G08B 29/18* | (2006.01) | |
| *G08B 31/00* | (2006.01) | |
| *H04W 4/02* | (2018.01) | |
| *H04W 4/029* | (2018.01) | |
| *H04W 4/48* | (2018.01) | |
| *H04W 4/90* | (2018.01) | |

(52) U.S. Cl.
CPC ..... *G08B 21/0225* (2013.01); *G08B 21/0266* (2013.01); *G08B 21/22* (2013.01); *G08B 25/005* (2013.01); *G08B 29/185* (2013.01); *H04W 4/023* (2013.01); *H04W 4/029* (2018.02); *H04W 4/48* (2018.02); *H04W 4/90* (2018.02); *B60N 2/267* (2023.08); *B60N 2/274* (2023.08); *B60N 2210/40* (2023.08); *B60N 2230/20* (2023.08); *G08B 25/10* (2013.01); *G08B 29/188* (2013.01); *G08B 31/00* (2013.01)

(58) Field of Classification Search
CPC .... G08B 25/005; G08B 25/10; G08B 29/185; G08B 29/188; G08B 31/00; B60N 2/002; B60N 2/26; H04W 4/023; H04W 4/029; H04W 4/48; H04W 4/90
See application file for complete search history.

(56) References Cited

U.S. PATENT DOCUMENTS

| | | |
|---|---|---|
| 6,922,622 B2 | 7/2005 | Dulin et al. |
| 6,924,742 B2 | 8/2005 | Mesina |
| 6,930,614 B2 | 8/2005 | Rackham et al. |
| 7,012,533 B2 | 3/2006 | Younse |
| 7,230,530 B1 | 6/2007 | Almquist |
| 7,348,880 B2 | 3/2008 | Hules et al. |
| 7,466,217 B1 | 12/2008 | Johnson et al. |
| 8,058,983 B1 | 11/2011 | Davisson et al. |
| 8,063,788 B1 | 11/2011 | Morningstar |
| 8,816,845 B2 | 8/2014 | Hoover et al. |
| 9,014,920 B1 | 4/2015 | Torres et al. |
| 9,202,316 B1 | 12/2015 | Trudell |
| 9,227,484 B1 | 1/2016 | Justice et al. |
| 9,469,176 B2 | 10/2016 | Boyer et al. |
| 2005/0038582 A1 | 2/2005 | Arndt et al. |
| 2006/0049922 A1* | 3/2006 | Kolpasky ............ B60R 25/257 340/426.13 |
| 2006/0061201 A1 | 3/2006 | Skinner |
| 2006/0103516 A1 | 5/2006 | Zang |
| 2006/0139159 A1 | 6/2006 | Lee et al. |
| 2006/0273917 A1 | 12/2006 | Rams |
| 2009/0212955 A1 | 8/2009 | Schoenberg et al. |
| 2010/0078978 A1* | 4/2010 | Owens ................ G08B 21/22 297/250.1 |
| 2010/0274570 A1* | 10/2010 | Proefke ................ B60L 53/67 701/22 |
| 2014/0148921 A1 | 5/2014 | Kwak |
| 2014/0309885 A1* | 10/2014 | Ricci ................ G06V 40/166 701/41 |
| 2015/0126234 A1* | 5/2015 | Rodriguez ........ H04M 1/72412 455/457 |
| 2016/0042616 A1 | 2/2016 | Dorsey |
| 2016/0200250 A1* | 7/2016 | Westmoreland ......... B60Q 9/00 340/457.1 |
| 2016/0272112 A1 | 9/2016 | DeGrazia et al. |
| 2016/0291964 A1 | 10/2016 | Nigul |
| 2017/0043714 A1* | 2/2017 | Lewis-Cheeks ....... G08B 21/22 |
| 2017/0116839 A1* | 4/2017 | Friedman ............... G08B 21/24 |
| 2017/0158186 A1 | 6/2017 | Soifer |
| 2018/0065504 A1* | 3/2018 | Lan ..................... B60W 10/30 |
| 2018/0354443 A1* | 12/2018 | Ebrahimi ............. B60N 2/2812 |

* cited by examiner

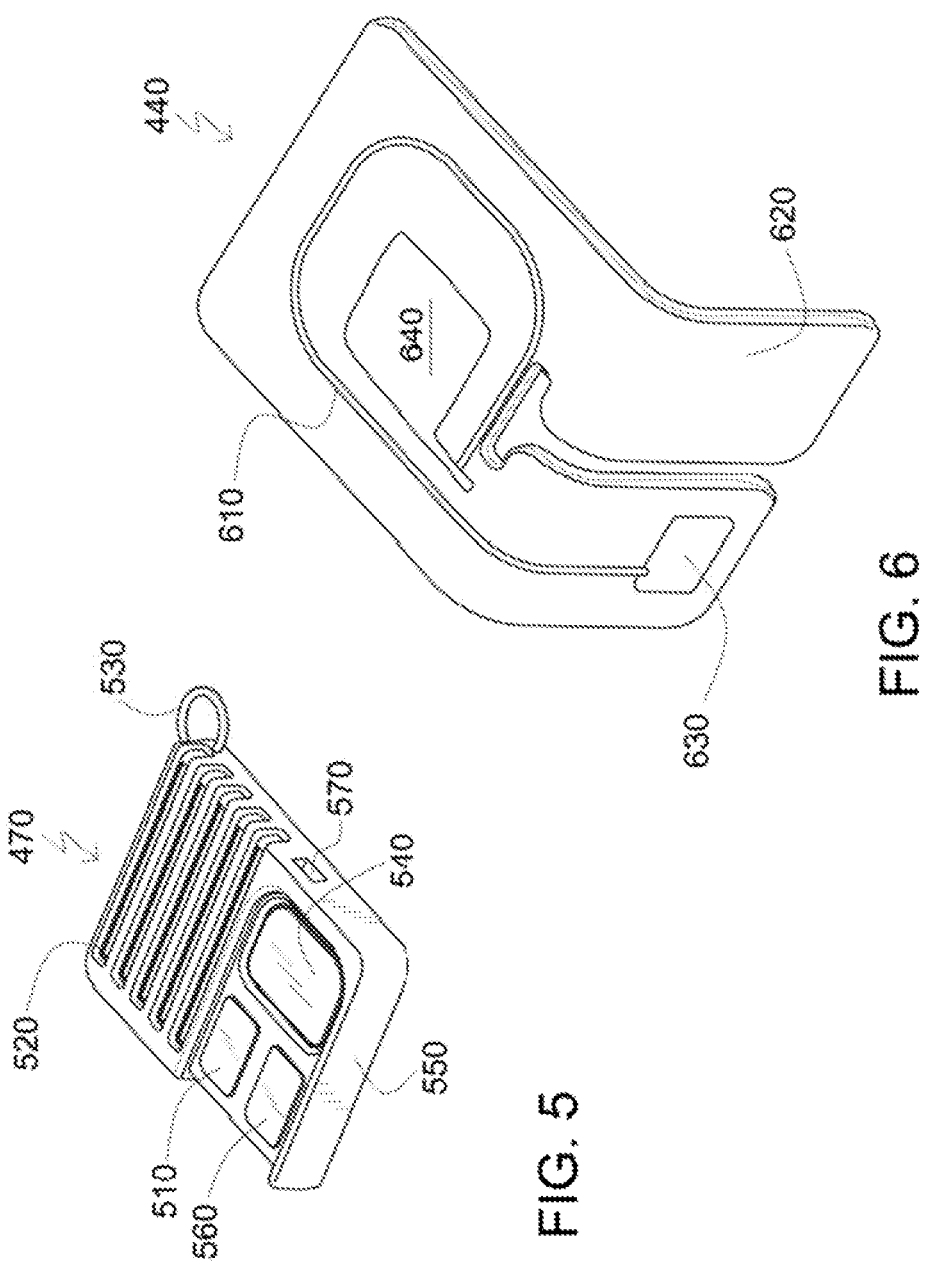

| STATE | ARM | ALARM | ALARM OFF |
|---|---|---|---|
| PRESSURE ON PAD | X | | |
| NO PRESSURE ON PAD | | | X |
| TEMPERATURE HIGH-LOW | | X | |
| TEMPERATURE OK | | | X |
| PAD BLUETOOTH IN PROXIMITY TO PHONE AND PAD | | | X |
| PAD BLUETOOTH OUT OF PROXIMITY TO PHONE OR KEY-FOB | | X | |
| KEY FOB BUTTON PUSH | | | X |
| KEY FOB IN PROXIMITY TO PHONE AND PAD | | | X |
| KEY FOB OUT OF PROXIMITY TO PHONE AND PAD | | X | |
| PHONE IN PROXIMITY TO FOB AND PAD | | | X |
| PHONE OUT OF PROXIMITY TO FOB AND PAD | | X | |
| GPS SHOWS MOVEMENT FASTER THAN SPEED SETTING | | | X |
| GPS SHOWS NO OR SLOW MOVEMENT | | X | |
| USER SETTING OVER RIDE OF SPECIFIC LOCATION | | | X |
| CLOUD SERVER RECEIVES OK STATUS | | | X |
| CLOUD SERVER DOES NOT RECEIVE STATUS OR STATUS IS NOT OK | | X | |

FIG. 11

METHOD, SYSTEM, AND DEVICE FOR PROTECTING VEHICLE OCCUPANTS

CROSS-REFERENCE TO RELATED APPLICATIONS

This application is a Continuation application of, under 35 U.S.C. § 120, and claims priority to, under 35 U.S.C. § 120, U.S. Non-Provisional application Ser. No. 17/020,582, entitled METHOD, SYSTEM, AND DEVICE FOR PROTECTING VEHICLE OCCUPANTS, by Susan Rogers et al., filed on Sep. 14, 2020. This invention claims priority therethrough, under 35 U.S.C. § 120, to U.S. Non-Provisional application Ser. No. 15/808,672, entitled METHOD, SYSTEM, AND DEVICE FOR PROTECTING VEHICLE OCCUPANTS, by Susan Rogers et al., filed on Nov. 9, 2017. This invention claims priority therethrough, under 35 U.S.C. § 120, to the U.S. Provisional Patent Application No. 62/419,533 by Susan Rogers filed on Nov. 9, 2016, which is incorporated by reference herein in its entirety.

BACKGROUND OF THE INVENTION

Field of the Invention

The present invention relates to methods and systems of protecting living beings, specifically methods and systems for protecting occupants of vehicles.

Description of the Related Art

Infants bring great joy to families. However, with a new baby in the home, parents or caretakers are often seriously sleep deprived due to an infant's irregular feeding and sleeping schedules. There is also evidence that some postpartum chemical changes in women cause reduced memory function. Further, long periods of sleep deprivation can have a significant effect on a person's memory. This can make it difficult for caregivers of infants to remember sometimes even very simple things.

Tragically, every year infants die or are seriously injured due to a driver forgetting that an infant is in the back seat of a car, and leaving the vehicle for a long period of time, such as while they are working, shopping, etc. If the weather is either very hot or very cold, the infant can perish prior to anyone becoming aware of the dangerous situation.

In the related art, it has been known to use timers, warning devices, and memory jogging tools to help parents remember things that they might otherwise forget. Some of these are specifically adapted to help make sure that caregivers do not forget a child in a car, especially during conditions where that might put the child in jeopardy. Some improvements have been made in the field. Examples of references related to the present invention are described below in their own words, and the supporting teachings of each reference are incorporated by reference herein:

U.S. Pat. No. 7,218,218 issued to Rogers, discloses a child detection system for a child seat includes a pressure sensor is adapted for detecting when weight is positioned on the presser sensor. The pressure sensor is selectively positioned within a seat cushion of a restraining seat. A primary processor is electrically coupled to the pressure sensor. The primary processor is adapted for is electrically coupled to a vehicle computer system of a vehicle in which is positioned the restraining seat. A sound emitter for emitting an audible sound is operationally coupled to the primary processor. The primary processor turns on the sound emitter for at least 3 seconds when the pressure sensor senses a weight thereon and the vehicle computer system determines that a driver's side door of the vehicle is open.

U.S. Pat. No. 7,348,880 issued to Hules et al., discloses a system and method are provided for alerting of an occupant endangered by being situated in a variable temperature setting. The system can be utilized within a motor vehicle, and occupants include an infant, a child, a person, and an animal or pet. In an aspect, when a security device receives a signal that an occupant sensor detects the presence of an occupant and a temperature sensor detects a predetermined temperature, both within a predetermined time period, then a security response is initiated. A security response can include triggering an audible alarm, flashing a light, lowering a window, unlocking a door, notifying an owner of the security device, and transmitting an emergency signal to an emergency system including telephone 911 and an emergency response company. The occupant sensor and the temperature sensor may be affixed to a key fob such that an antenna transmits to the security device.

U.S. Pat. No. 8,058,983 issued to Davisson et al. discloses a baby seat occupant detection system that functions to reliably remind forgetful or negligent caregivers when they have an infant in a car seat inside a vehicle and have left a predetermined proximity around the vehicle. In one embodiment, the invention comprises a temperature detector for detecting unsafe temperatures and sounding an alarm to alert a caregiver when the temperature inside a vehicle has risen to a level which is unsafe for the occupant left unattended in the vehicle.

U.S. Patent Application Publication No.: 2017/0158186 by Soifer, discloses a passive vehicular heatstroke prevention system monitors carbon dioxide ($CO_2$) and infrared (IR) energy levels to determine whether a child is present inside a closed vehicle, and, if so, monitors the temperature in the vehicle and, if the temperature in the vehicle exceeds at least one preset critical value, automatically lowers the temperature in the vehicle and contacts the driver/caregiver and/or emergency personnel. The system detects the presence of a child in the closed vehicle by detecting a critical level of carbon dioxide in the air within the vehicle, while monitoring the interior vehicle temperature and takes corrective action to prevent the temperature from exceeding a preset value, such as by activating the vehicle's air conditioning unit and lowering the vehicle's windows, as well as contacting the driver/caregiver and/or emergency personnel.

The inventions heretofore known suffer from a number of disadvantages which include but are not limited to not being sufficiently safe, failing to provide safety in the event of failure of a caregiver to respond, being adapted to only prevent one type or class of dangerous situation, failing to reduce worry (e.g. of the caregiver/parents), failing to provide for management by a third party expert system, not being adaptive, failing to provide an alert during an alert situation when communication is interrupted, being prone or subject to failure, and/or failing to track relevant data/devices/individuals/states.

What is needed is a method, system, and/or device that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available methods, systems, and devices. Accordingly, the present invention has been developed to provide a method, system, and/or device for protecting vehicle occupants.

According to one embodiment of the invention, there is a system for protecting a vehicle occupant over a computerized network, that may include one or more of: an electronic seat pad that may include an occupant sensor that may collects data related to the presence of an occupant within the vehicle; a driver sensor control module that may collect data related to the position of a driver's portable electronic computing device relative to the vehicle; a key-location sensor that may collect data related to the position of a driver's keys relative to the vehicle; a first remote notification device that may receive alert status notifications and that may issue an alert if it receives an alert notification and/or may issue an alert if it does not receive an expected threshold of safety notifications: a communication system in communication with one or more of the electronic seat pad, the driver sensor control module, and the key-location sensor and/or that receives and/or transmits collected data from each thereof; and/or a system management module that may operate on a computing device having a processor and/or network communication hardware that may be in communication with the communication system over the computerized network that may receive data collected from one or more of the electronic seat pad, the driver sensor control module, and/or the key-location sensor, which may include: instructions for determining an alert status using the processor based on data collected from each of the electronic seat pad, the driver sensor control module, and the key-location sensor; and/or instructions for sending alert notifications and safety notifications to the first remote notification device over the computerized network via the communication hardware based on the alert status. There may also be a state library in communication with a logic subscription module wherein updated alert conditions are automatically provided over time such that the instructions for determining an alert status may change over time. There may also be a second remote notification device and wherein the system management module includes instructions for notifying the second remote notification device if no response is received from the first remote notification device in response to an alert notification.

It may be that the remote notification device is a smartphone that includes the driver sensor control module. It may be that the electronic seat pad further includes an electronically activated cooling device in communication with the system management module. It may be that the key-location sensor is housed within a key-fob to which keys are attached. It may be that the key-fob includes a microphone functionally coupled to a speaker in the vehicle such that a user of the key-fob can send a verbal message to an interior of the vehicle. It may be that the driver sensor control module determines proximity to the vehicle by whether or not a limited range wireless connection to an electronic device associated with the vehicle is active or not active. It may be that the key-location sensor determines proximity to the vehicle by whether or not a limited range wireless connection to an electronic device associated with the vehicle is active or not active. It may be that the instructions for determining an alert status using the processor based on data collected from each of the electronic seat pad, the driver sensor control module, and the key-location sensor include instructions for generating an alert notification in each of the following cases wherein the data infers that the:

a. occupant is present, the keys are not present, and the driver's portable electronic device is not present;
   b. occupant is present, the keys are present, and the driver's portable electronic device is not present; and
   c. occupant is present, the keys are not present, and the driver's portable electronic device is present.

In another non-limiting embodiment, there may be a method of protecting an occupant of a vehicle using a computing system over a computerized network, comprising one or more of the steps of: receiving occupancy data from an electronic seat pad present within the vehicle; receiving first proximity data from a driver sensor control module that detects whether a portable electronic device of a driver of the vehicle is present with the vehicle or not; receiving second proximity data from a key-location sensor that detects whether keys of the vehicle are present with the vehicle or not; determining an alert status based on occupancy data, first proximity data, and second proximity data using a processor of the computing system; automatically transmitting an electronic message of the alert status to a first remote notification device, the electronic message either including an alert notification or a safety notification; automatically activating an alert message on the remote notification device in response to an alert notification; and/or automatically activating an alert message on the remote notification device in response to a lack of safety notifications. Other steps may include: automatically transmitting an electronic message of the alert status to a second remote device if no response is received from the first remote device; automatically activating an electronically activated cooling device within the vehicle in response to either an alert notification or a lack of safety notifications; updating instructions for determining an alert status based on custom alert status instructions customized for a location of the vehicle; updating instructions for determining an alert status based on custom alert status instructions customized for a demographic characteristic of a driver of the vehicle; updating instructions for determining an alert status based on custom alert status instructions customized for a demographic characteristic of the occupant; and/or automatically tracking a last known location of the vehicle and automatically transmitting the last known location of the vehicle in association with an alert notification.

It may be that the step of determining an alert status using the processor based on data collected from each of the electronic seat pad, the driver sensor control module, and the key-location sensor is based on instructions for generating an alert notification in each of the following cases wherein the data infers that the:

a. occupant is present, the keys are not present, and the driver's portable electronic device is not present;
   b. occupant is present, the keys are present, and the driver's portable electronic device is not present; and
   c. occupant is present, the keys are not present, and the driver's portable electronic device is present.

In yet another embodiment, there may be a device for protecting an occupant of a vehicle, that may include one or more of: an occupant detection sensor that detects the presence of an occupant; a key proximity detection sensor that detects the proximity of a vehicle key; a communication device that communicates with a portable electronic device of a driver of the vehicle; an alert determination module that determines if an alert status is present based on whether or not there is an occupant present and whether either of the vehicle key or the portable electronic device of the driver of the vehicle are present; and/or an alert action device that automatically activates if an alert status is present.

It may be that the alert action device is selected from the group of devices consisting of: an electronically activated cooling device, and an alarm sounding device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment, in other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). It is noted that the drawings of the invention are not to scale. The drawings are mere schematics representations, not intended to portray specific parameters of the invention. Understanding that these drawing(s) depict only typical embodiments of the invention and are not, therefore, to be considered to be limiting its scope, the invention will be described and explained with additional specificity and detail through the use of the accompanying drawing(s), in which:

FIG. 5 illustrates a perspective view of a keychain fob, according to one embodiment of the invention;

FIG. 6 illustrates a perspective view of a seat pad, according to one embodiment of the invention;

FIG. 11 is a state chart of a system for protecting occupants of a vehicle, according to one embodiment of the invention.

DETAILED DESCRIPTION OF THE INVENTION

Figure 1:
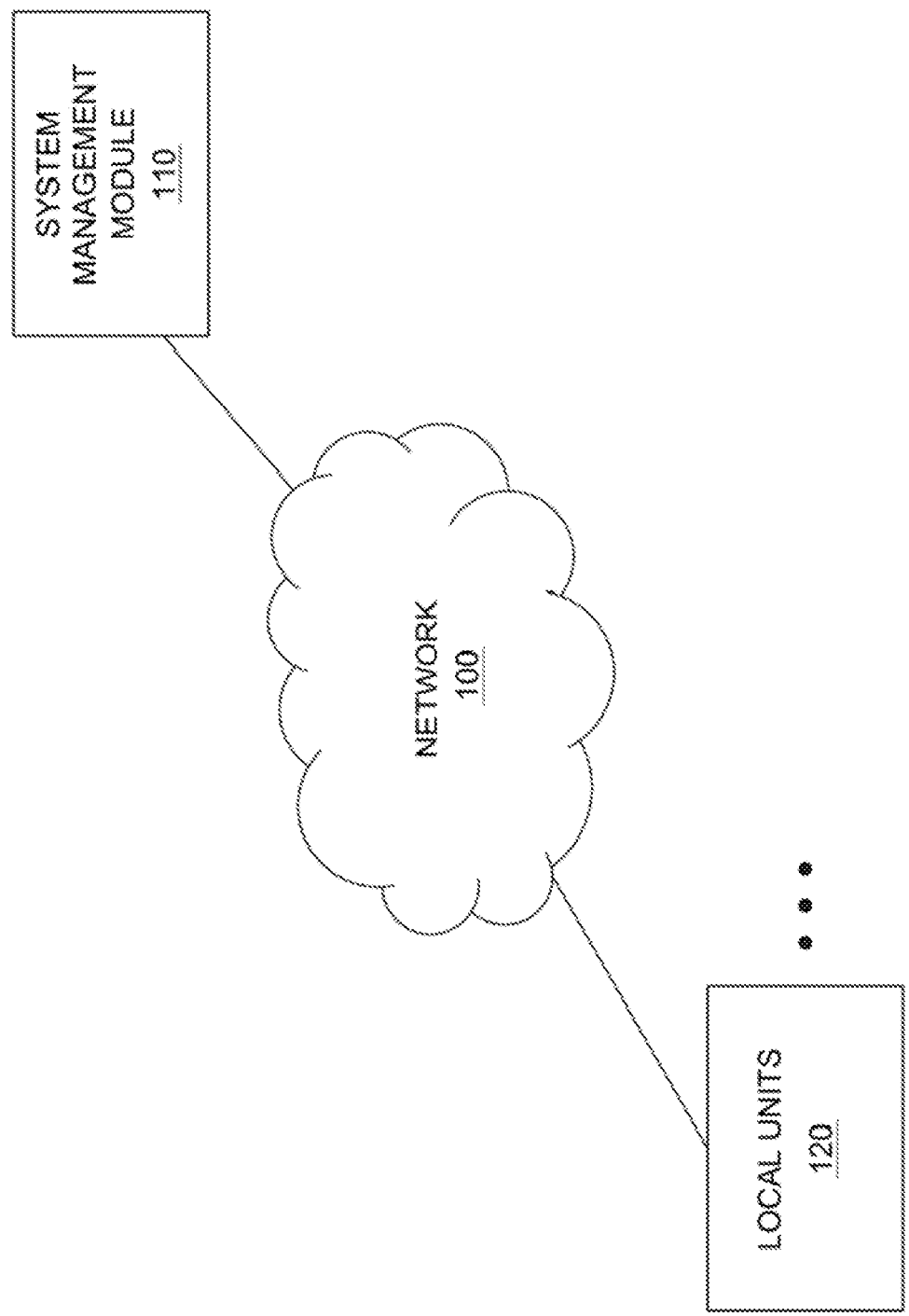
FIG. 1 is a network diagram of a system for protecting vehicle occupants, according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to an "embodiment," an "example" or similar language means that a particular feature, structure, characteristic, or combinations thereof described in connection with the embodiment is included in at least one embodiment of the present invention. Thus, appearances of the phrases an "embodiment," an "example," and similar language throughout this specification may, but do not necessarily, all refer to the same embodiment, to different embodiments, or to one or more of the figures. Additionally, reference to the wording "embodiment," "example" or the like, for two or more features, elements, etc. does not mean that the features are necessarily related, dissimilar, the same, etc.

Each statement of an embodiment, or example, is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The features, functions, and the like described herein are considered to be able to be combined in whole or in part one with another as the claims and/or art may direct, either directly or indirectly, implicitly or explicitly.

As used herein, "comprising," "including," "containing," "is," "are," "characterized by," and grammatical equivalents thereof are inclusive or open-ended terms that do not exclude additional unrecited elements or method steps. "Comprising" is to be interpreted as including the more restrictive terms "consisting of" and "consisting essentially of."

Many of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of programmable or executable code may, for instance, comprise one or more physical or logical blocks of computer instructions which may, for instance, be organized as an object, procedure, or function.

Nevertheless, the executables of an identified module need not be physically located together, but may comprise disparate instructions stored in different locations which, when joined logically together, comprise the module and achieve the stated purpose for the module. Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server, motherboard, network, chipset or other computing system including a processor for processing digital data; a memory device coupled to a processor for storing digital data; an input digitizer coupled to a processor for inputting digital data; an application program stored in a memory device and accessible by a processor for directing processing of digital data by the processor; a display device coupled to a processor and/or a memory device for displaying information derived from digital data processed by the processor; and a plurality of databases including memory device(s) and/or hardware/software driven logical data storage structure(s).

Various databases/memory devices described herein may include records associated with one or more functions, purposes, intended beneficiaries, benefits and the like of one or more modules as described herein or as one of ordinary skill in the art would recognize as appropriate and/or like data useful in the operation of the present invention.

As those skilled in the art will appreciate, any computers discussed herein may include an operating system, such as but not limited to: Android, iOS, BSD, IBM z/OS, Windows Phone, Windows CE, Palm OS, Windows Vista, NT, 95/98/2000, OS X, OS2; QNX, UNIX; GNU/Linux; Solaris; MacOS; and etc., as well as various conventional support software and drivers typically associated with computers. The computers may be in a home, industrial or business environment with access to a network. In an exemplary embodiment, access is through the Internet through a commercially-available web-browser software package, including but not limited to Internet Explorer, Google Chrome, Firefox, Opera, and Safari.

The present invention may be described herein in terms of functional block components, functions, options, screen shots, user interactions, optional selections, various processing steps, features, user interfaces, and the like. Each of such described herein may be one or more modules in exemplary embodiments of the invention even if not expressly named herein as being a module. It should be appreciated that such functional blocks and etc. may be realized by any number of hardware and/or software components configured to perform the specified functions. For example, the present invention may employ various integrated circuit components, e.g., memory elements, processing elements, logic elements, scripts, look-up tables, and the like, which may carry out a variety of functions under the control of one or more microprocessors or other control devices. Similarly, the software elements of the present invention may be implemented with any programming or scripting language such as but not limited to Eiffel, Haskell, C, C++, Java, Python, COBOL, Ruby, assembler, Groovy, PERL, Ada, Visual Basic, SQL Stored Procedures, AJAX, Bean Shell, and extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention may detect or prevent security issues with a client-side scripting language, such as JavaScript, VBScript or the like.

Additionally, many of the functional units and/or modules herein are described as being "in communication" with other functional units, third party devices/systems and/or modules. Being "in communication" refers to any manner and/or way in which functional units and/or modules, such as, but not limited to, computers, networks, mobile devices, program blocks, chips, scripts, drivers, instruction sets, databases and other types of hardware and/or software, may be in communication with each other. Some non-limiting examples include communicating, sending, and/or receiving data and metadata via: a wired network, a wireless network, shared access databases, circuitry, phone lines, internet backbones, transponders, network cards, busses, satellite signals, electric signals, electrical and magnetic fields and/or pulses, and/or so forth.

As used herein, the term "network" includes any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using other protocols, including but not limited to IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

FIG. 1 is a network diagram of a system for protecting vehicle occupants, according to one embodiment of the invention. There is shown a network 100 in communication with each of a system control module 110 and a plurality of local units 120. The illustrated system provides enhanced safety for occupants of vehicles, especially infants, children, and pets who might be inadvertently left in a vehicle during times when heat/cold of the environment may pose a danger to said occupants. The local units collect data regarding indicators of safety for the occupant of a vehicle and the system management module manages remote notifications and analysis regarding whether there is a dangerous situation for the occupant. The system management module may customize what constitutes an alert to geographic details (e.g. nanny drove the child to a location identified within the system as being off-limits or dangerous, duration since last safety notification may be customized to the expected connection capabilities of a particular area), and/or to demographic details related to the occupant or driver (e.g. temperature or air condition thresholds may be different for animals compared to people, older children may trigger an alert after being left alone for a longer period of time than infants). The illustrated system may be utilized to prevent children from dying in the car seat and to alert the parent or caregiver to get the child and/or to prevent other dangerous situations to various types of occupants (e.g. elderly family members, people with specific health conditions, pets, and teenagers).

In one non-limiting embodiment, there is a seat pad, phone app, an alarm on a key fob, a fail-safe in the system on the cloud, each in communication such that dangerous states may be detected and alerts may be sent to the parent or caregiver to prevent them from forgetting the occupant of the vehicle. There may also be a car door alarm device (e.g. magnet sensor mounted on the door and frame that thereby sense when the door is opened because of the changing magnetic field at the sensor) for the door (or for two-doors) that will alert the parent or caregiver if the door of the vehicle is opened. This can prevent a child from dying if they sneak into the car while the car is parked. There may also be a solar charger that can charge one or more of the devices described herein through solar power.

In another non-limiting embodiment, there is an in-car seat system that works intelligently with a key-fob and a cloud server that works together to positively identify if there is a child in the car seat without the vehicle. Included in the system is a pad that may be disposed in the seat or car seat with sensors to detect the presence of an occupant (e.g. pressure sensors, CO2 sensors, IR sensors), the user's smartphone or other similar portable electronic device, an electronic key fob and a cloud-based management system. Those included portions are integrated together.

In operation, there is a signal that goes from the cloud to the users smartphone that says everything is fine (safety notification). If there is no signal saying that the child is removed from the seat and the car is not moving and the parent is not in proximity to the child, then there is a signal that goes to the parent's phone and to the fob to alert them. If the parent does not respond, then there is an automated protocol for whom else to automatically notify via the system. The cloud also keeps track of the last known location of the vehicle so that people can respond quickly if there is an alert that a child is left in the car.

According to still another embodiment of the invention, there is a system for protecting a vehicle occupant over a computerized network, that may include one or more of: an electronic seat pad that may include an occupant sensor that may collects data related to the presence of an occupant within the vehicle; a driver sensor control module that may collect data related to the position of a driver's portable electronic computing device relative to the vehicle; a key-location sensor that may collect data related to the position of a driver's keys relative to the vehicle; a first remote notification device that may receive alert status notifications and that may issue an alert if it receives an alert notification and/or may issue an alert if it does not receive an expected threshold of safety notifications: a communication system in communication with one or more of the electronic seat pad, the driver sensor control module, and the key-location sensor and/or that receives and/or transmits collected data from each thereof; and/or a system management module that may operate on a computing device having a processor and/or network communication hardware that may be in communication with the communication system over the computerized network that may receive data collected from one or more of the electronic seat pad, the driver sensor control module, and/or the key-location sensor, which may include: instructions for determining an alert status using the processor based on data collected from each of the electronic seat pad, the driver sensor control module, and the key-location sensor; and/or instructions for sending alert notifications and safety notifications to the first remote notification device over the computerized network via the communication hardware based on the alert status. There may also be a state library in communication with a logic subscription module wherein updated alert conditions are automatically provided over time such that the instructions for determining an alert status may change over time. There may also be a second remote notification device and wherein the system management module includes instructions for notifying the second remote notification device if no response is received from the first remote notification device in response to an alert notification.

It may be that the remote notification device is a smartphone that includes the driver sensor control module. It may be that the electronic seat pad further includes an electronically activated cooling device in communication with the system management module. It may be that the key-location sensor is housed within a key-fob to which keys are attached. It may be that the key-fob includes a microphone functionally coupled to a speaker in the vehicle such that a user of the key-fob can send a verbal message to an interior of the vehicle. It may be that the driver sensor control module determines proximity to the vehicle by whether or not a limited range wireless connection to an electronic device associated with the vehicle is active or not active. It may be that the key-location sensor determines proximity to the vehicle by whether or not a limited range wireless connection to an electronic device associated with the vehicle is active or not active. It may be that the instructions for determining an alert status using the processor based on data collected from each of the electronic seat pad, the driver sensor control module, and the key-location sensor include instructions for generating an alert notification in each of the following cases wherein the data infers that the:
  a. occupant is present, the keys are not present, and the driver's portable electronic device is not present;
  b. occupant is present, the keys are present, and the driver's portable electronic device is not present; and
  c. occupant is present, the keys are not present, and the driver's portable electronic device is present.

Figure 2:
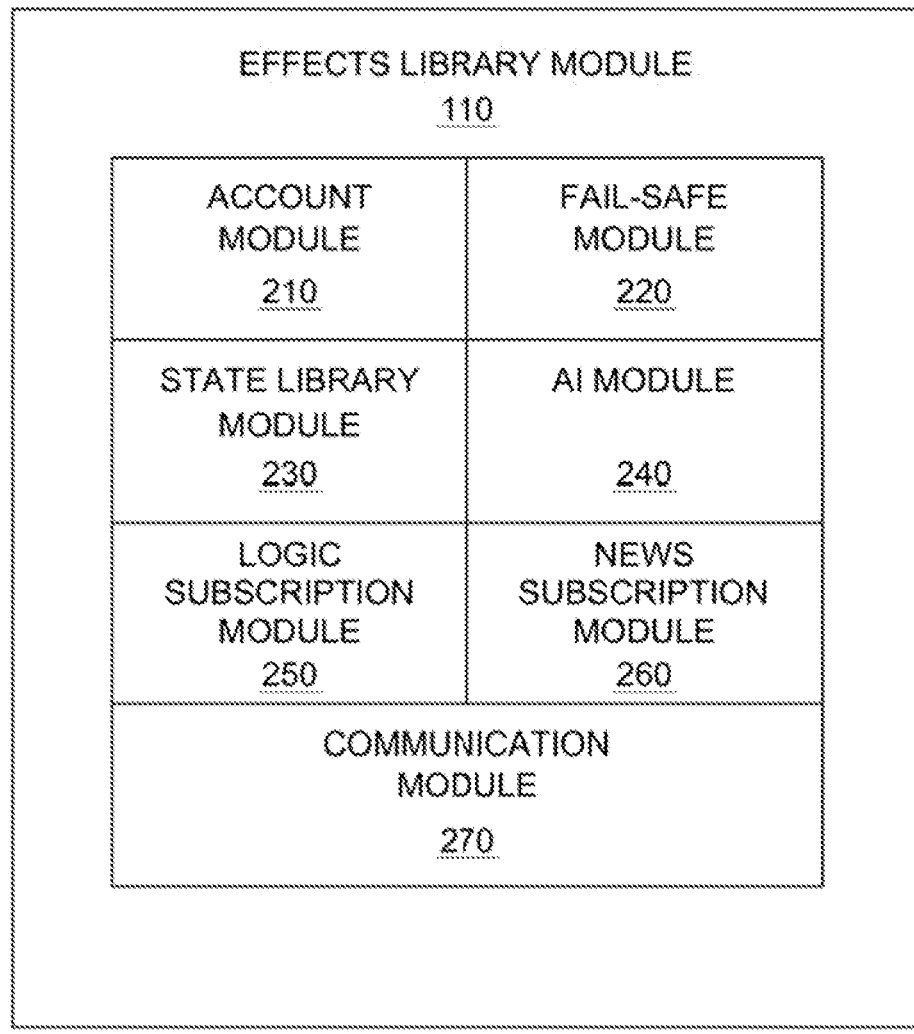
FIG. 2 is a module diagram of a system management module of a system for protecting vehicle occupants, according to one embodiment of the invention.

FIG. 2 is a module diagram of a system management module of a system for protecting vehicle occupants, according to one embodiment of the invention. The illustrated system management module 110 includes: an account module 210, a fail-safe module 220, a state library module 230, an AI module 240, a logic subscription module 250, a news subscription module 260, and a communication module 270. The illustrated system management module may operate on one or more servers and be connected to a network, such as but not limited to the internet, cellular networks, an intranet, a private network, and the like and combinations thereof. The illustrated system management module receives data collected from one or more of the electronic seat pad, the driver sensor control module, and/or the key-location sensor, which may include: instructions for determining an alert status using the processor based on data collected from each of the electronic seat pad, the driver sensor control module, and the key-location sensor; and/or instructions for sending alert notifications and safety notifications to the first remote notification device over the computerized network via the communication hardware based on the alert status.

The illustrated account module 210 includes instructions for managing a plurality of user accounts so that a plurality of local unit groups may be coupled thereto and benefit from the same analytical and notification functions of the system management module. The account module may include a database of users, with records that include user information, system settings, default settings, automatic notification information, contact information, customized operational scripts, related media files (e.g. photos of children and pets). Account management software may be utilized and/or adapted within the account module to provide one or more of these functions. Non-limiting examples of such are provided as: OneLogin User Identity Management Solution by OneLogin, Inc. of San Francisco, California; and Pleasant Password Server of Pleasant Solutions Cheyenne Wyoming.

The illustrated fail-safe module 220 includes hardware and/or software encoded instructions for analyzing incoming sensor data and determining alert status of the system, as well as triggering automatic notifications of the alert status which the communication module publishes. There may be instructions for generating an alert notification in each of the following cases wherein the data infers that the: occupant is present, the keys are not present, and the driver's portable electronic device is not present; occupant is present, the keys are present, and the driver's portable electronic device is not present; and occupant is present, the keys are not present, and the driver's portable electronic device is present. Instructions may be updated by and or located in the state library module 230 wherein the fail-safe module can be continually improved to provide additional functionality and continue to improve the safety of the occupant(s) even under changing conditions/situations (e.g. as the infant progresses through childhood and adolescence). There may be one or more scripts and/or programmable logic that takes incoming sensor data and produces outputs that are interpreted by the system as being "alert status." The fail-safe module may operate on a computing device, such as but not limited to a server having a processor.

Figure 7:
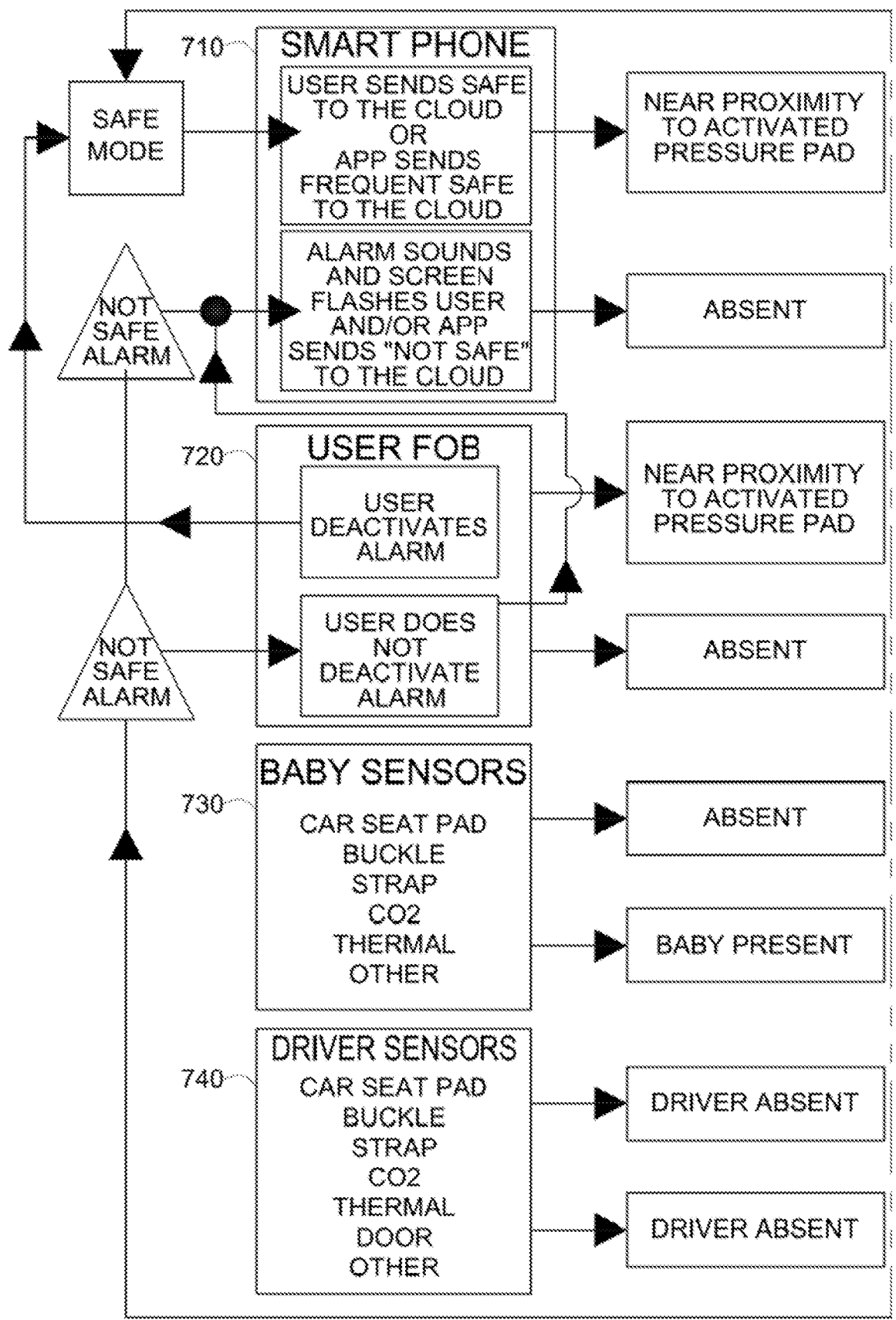
FIGS. 7-10 together show a state logic diagram showing determination of safe/alert states, according to one embodiment of the invention.
Figure 8:
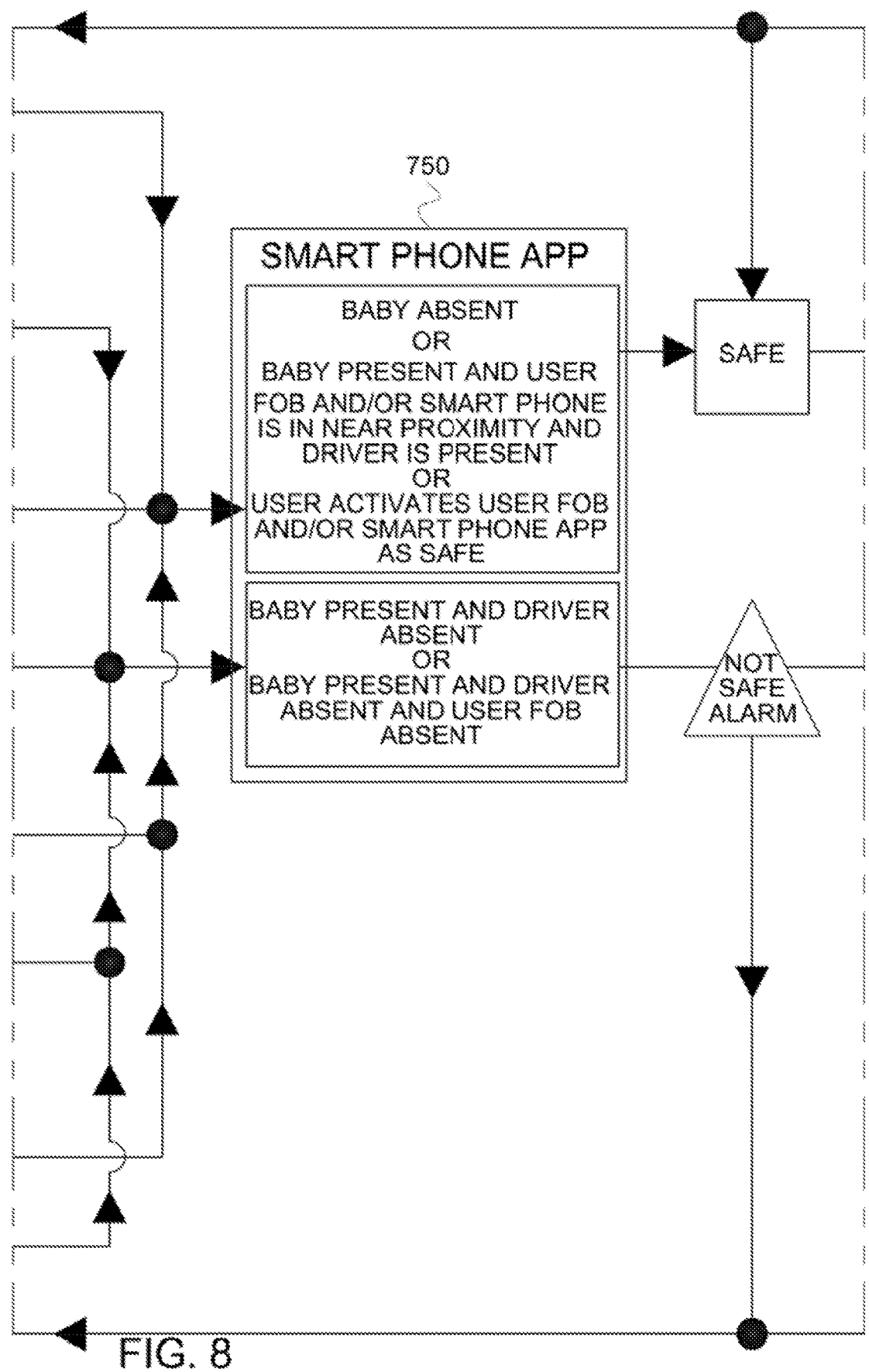
Figure 9:
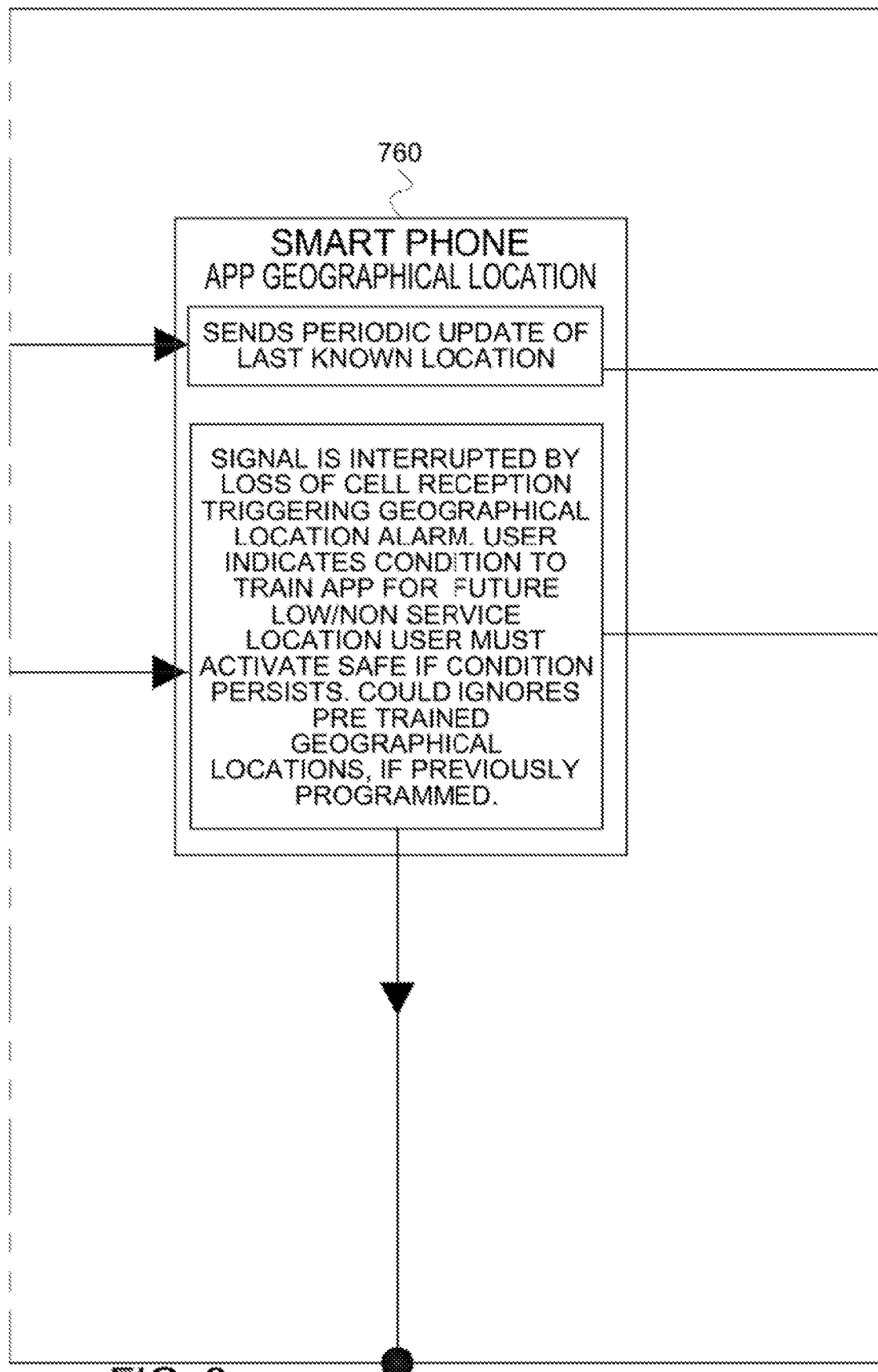
Figure 10:
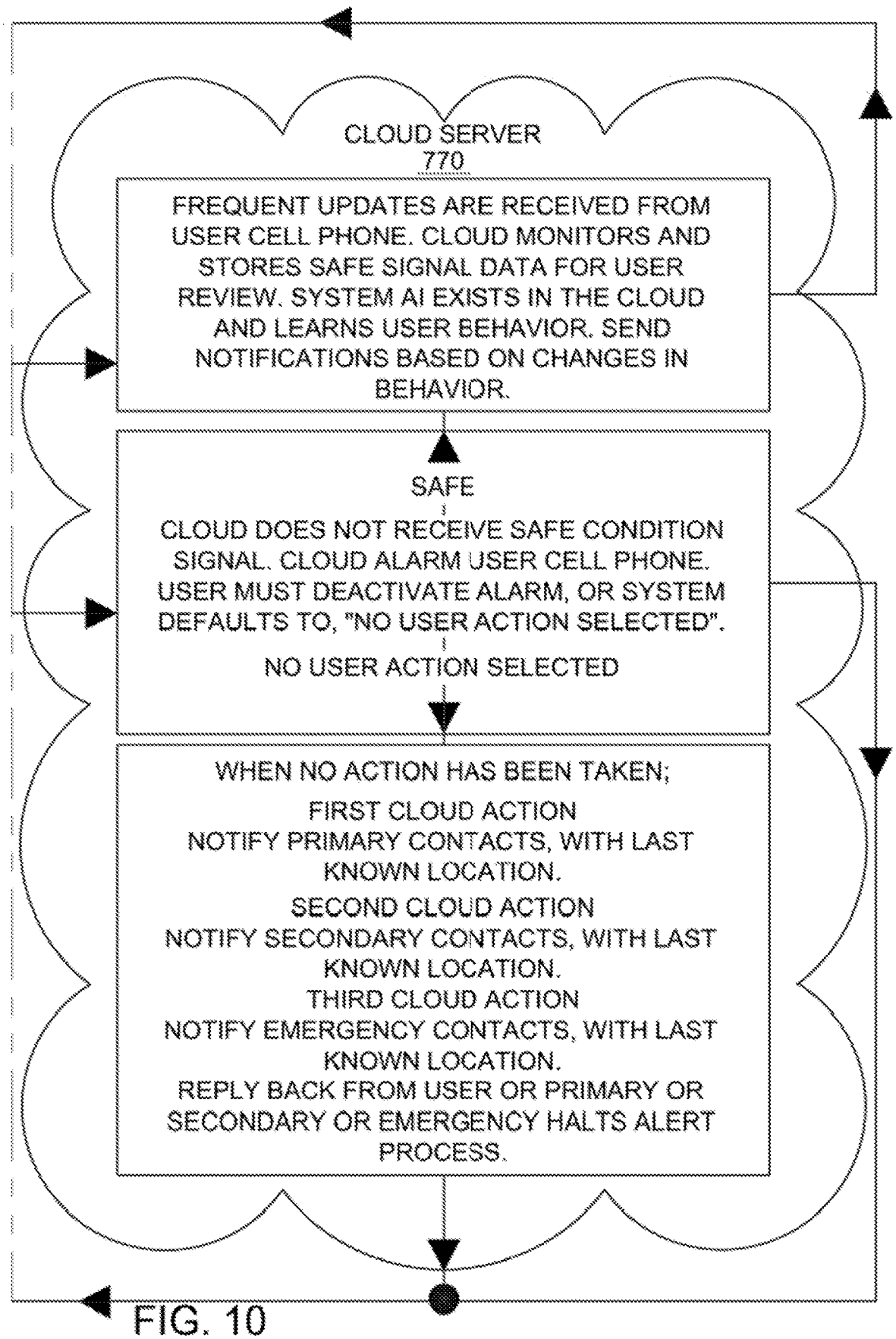

The illustrated state library module 230 is a library of state records that may be updated to allow for additional state logic with which the fail-safe module may operate. Such may be stored on a database or other data structure within a data storage device of a computing device, such as but not limited to a server. The library may be functionally coupled to a learning module and/or a subscription module (logic or news) such that new state records may be added to the database/data structure. The state records may be similar to those shown in FIGS. 7 (more complicated) and 8 (simpler) and may serve as the primary analysis engine of a fail-safe module. The library may be stored on one or more data storage modules/devices. A data storage module/device may be in communication with the modules and components of the system. The data storage module stores data for one or more of the modules of the system. Data storage modules may be databases and/or data files and the memory storage device may be, but is not limited to, hard drives, flash memory, optical discs, RAM, ROM, and/or tapes. A non-limiting example of a data base is Filemaker Pro 11, manufactured by Filemaker Inc., 5261 Patrick Henry Dr., Santa Clara, Calif., 95054. Non-limiting examples of a data storage module may include: a HP Storage Works P2000 G3 Modular Smart Array System, manufactured by Hewlett-Packard Company, 3000 Hanover Street, Palo Alto, Calif., 94304, USA; or a Sony Pocket Bit USB Flash Drive, manufactured by Sony Corporation of America, 550 Madison Avenue, New York, N.Y., 10022.

The illustrated AI module 240 may provide artificial intelligence to the system such that the system may learn from incoming data from the plurality of local unit groups and/or from one or more subscriptions. The AI module may collect data regarding alert status, precedential conditions, sensor data and other data received and may automatically sort, analyze, and draw conclusions and make recommendations as to additional state records for the state library, and/or ways to customize one or more other modules for a particular local unit group and/or collection thereof. AI software may be incorporated into the system by connecting it to incoming data and feeding it resulting and/or consequential data (e.g. feedback from users with respect to how the system works in specific instances) and then allowing the AI system to draw conclusions, analyze conditions, and/or suggest solutions. There may be a learning module within the AI module (e.g. coupled to a state library with location based information that increases over time such as but not limited to places where the system determines that you lose cell service). Non-limiting examples of such AI software are: Hitachi AI Technology software/hardware provided by Hitachi, Ltd. of Tokyo Japan and IBM Watson of International Business Machines Corp. of Armonk New York.

The illustrated logic subscription module 250 allows a user to subscribe to ongoing improvements to the state library. The logic subscription module includes instructions for determining if one or more new (new to the user) state library records are appropriate to add to the state library used by the user account. Such may include one or more data filters that filters out state library records that do not apply to a particular user (e.g. a state library record that was generated specifically for locations with heavy snowfall may be filtered out for a user account having an address in Florida). There may be one or more searching/query tools within the logic subscription module that allow for a user to search for applicable state library logic records, such as when circumstances, characteristics or conditions change for a user account (e.g. they move, someone in the family contracts a particular condition). There may be one or more scripts within the logic subscription module that automatically add filtered logic records to the state library of a user. Accordingly, the user may benefit from ever increased and improved safety for the occupants of their vehicle(s).

The illustrated news subscription module 260 may automatically provide relevant news/media/tips/guides items related to categories of interest to one or more users of the system. The module may filter through a stream of news items for topics, words, categories, and/or subject matter listed as desired by the user. The user may thereby be provided with such information, automatically, to their portable computing device and/or audio devices, where the news/etc. is audio-based. As a non-limiting example, the system may provide a stream of articles over time of how to improve your memory to a user/driver/caregiver.

The illustrated communication module 270 includes one or more communication devices such as a network card, system bus, or wireless communication module, and communicates with a computerized network. The communication module provides communication capabilities, such as wireless communication, to the modules and components of the system and the components and other modules described herein. The communication module provides communication between a wireless device, such as a mobile phone, and a computerized network and/or to facilitate communication between a mobile device and other modules described herein. The communication module may have a component thereof that is resident on a user's mobile device or on a user's desktop computer. Non-limiting examples of a wireless communication module may be but not limited to: a communication module described in U.S. Pat. No. 5,307,463, issued to Hyatt et al.; or a communication module described in U.S. Pat. No. 6,133,886, issued to Fariello et al., which are incorporated for their supported herein.

Figure 3:
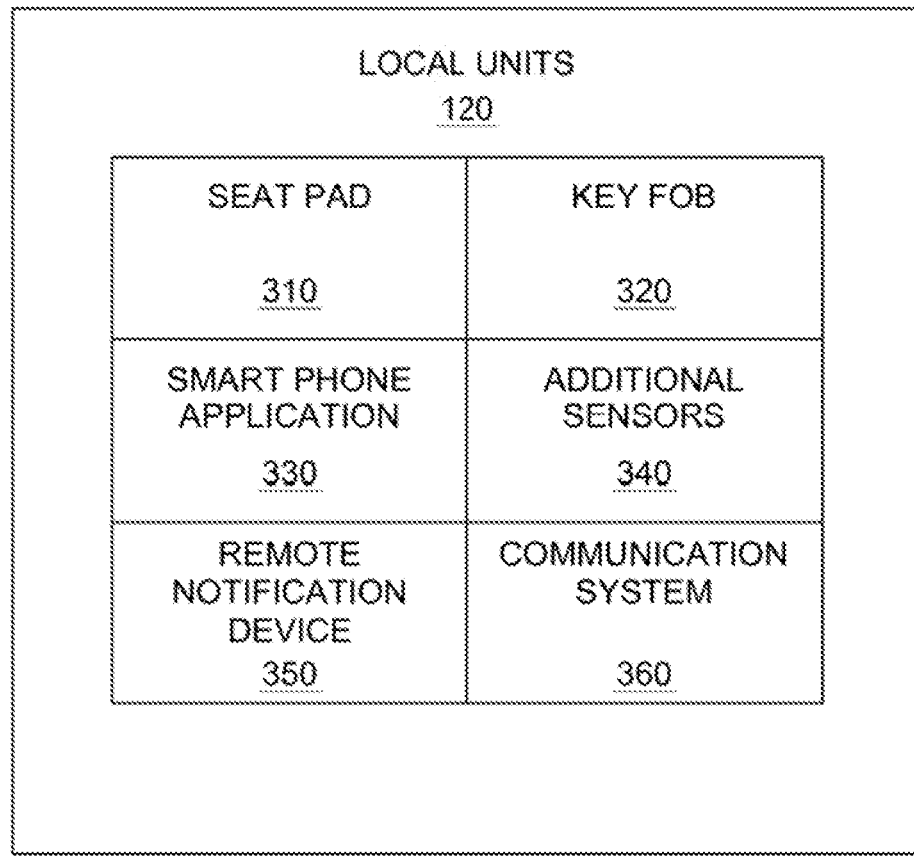
FIG. 3 is a module diagram of local units of a system for protecting vehicle occupants, according to one embodiment of the invention.

FIG. 3 is a module diagram of local units of a system for protecting vehicle occupants, according to one embodiment of the invention. There is shown a group of local units 120 including a seat pad 310, a key fob 320, a smartphone application 330, additional sensors 340, a remote notification device 350, and a communication system 360. The illustrated group of local units operates to provide information to the system management module for analysis and production of alert/safety notification messages.

The illustrated seat pad (electronic seat pad) 310 provides a physical object that may be placed in the vehicle and includes communication module(s) and one or more sensors for detecting the presence of a vehicle occupant. As a seat pad, it may be placed in an infant car seat and may detect the presence of an infant in the car seat by using a pressure sensor disposed thereon/therein such that when an infant is sitting in the car seat, the pressure sensor detects an increased pressure and when the infant is removed detects a decreased pressure. The seat pad may communicate sensor information over one or more wired and/or wireless communication devices included with the seat pad, such as but not limited to a Bluetooth, WiFi, of cellular device in communication with a network, or simply a wired communication line into the computerized network of the vehicle. In another embedment, the seat pad includes a $CO_2$ sensor and uses readings of the same to determine the presence or absence of a breathing occupant (e.g. child, pet) in the vehicle.

The illustrated key fob 320 couples to the keys or other ignition/entry token(s) for the vehicle and track the location of the same with respect to the vehicle. Accordingly, such provides an indicator as to whether the keys are proximate the vehicle or not. Where the keys leave the vicinity of the vehicle (which may be a predefined distance from the vehicle or may be calculated in another manner), the system is notified (e.g. by the key-fob itself or by another component of the system). This provides an indicator that the driver may have left the vehicle. In one non-limiting embodiment, the key-fob is coupled to a limited range wireless network (e.g. Bluetooth) and so long as it is connected or so long as a signal strength is above a predefined threshold, the key-fob is considered by the system to be proximate the vehicle. If the signal strength drops below the threshold or communication is lost, the system registers the key-fob as being not proximate the vehicle. The key-fob may also include communication devices to produce audio messages (e.g. siren, warning sounds, speech) for the driver in response to alert/safety messages and/or to allow the driver to communicate wirelessly to a speaker/microphone that may be present in the vehicle.

The illustrated smartphone application 330 provides information to the system about the position of the smartphone on which it is resident relative to the vehicle. This is a second indicator as to a location of the driver, which is useful as some drivers may leave, for various reasons, their key-fob in the vehicle but walk off with a smartphone in their pocket, or vice-versa. The smartphone application includes a driver sensor control module that collects data related to the position of a driver's portable electronic computing device relative to the vehicle and also includes a communication module that allows the smartphone to communicate with the system over one or more networks. The smartphone may also include instructions for analyzing and/or processing alert signals, alert statuses, and/or alert/safety messages. The smartphone application may also include communication utilities to produce audio messages (e.g. siren, warning sounds, speech) for the driver in response to alert/safety messages and/or to allow the driver to communicate wirelessly to a speaker/microphone that may be present in the vehicle.

The illustrated additional sensors 340 may include one or more sensors, including but not limited to buckle sensors for determining if buckles are fastened or not, door sensors to detect if a door is open or closed, ignition sensors to determine if the car is on/off or has started, heat sensors to determine temperature within the cabin of the vehicle, $CO_2$ sensors to determine relative concentrations of $CO_2$ in the air, and/or other in-car sensors that come with the car. These sensors may be disposed within the vehicle and/or on the electronic seat pad and may be in communication with the system such that the smartphone application and/or the system management module may receive data therefrom.

The illustrated remote notification device 350 may be one or more devices, such as but not limited to the smartphone, the key-fob, a desktop computer, a tablet, and/or any other device functionally coupled to a network and able to produce notification messages.

The illustrated communication system 360 is generally distributed over the plurality of local units (i.e. key fob(s), smartphone(s), seat pad(s), in-car sensor(s), remote notification device(s)) and includes communication devices appropriate for each component. There may be a plurality of wired and/or wireless communication devices, such as but not limited to network buses, wireless hotspots, Bluetooth communication devices, WiFi devices, cellular transponders, and the like and combinations thereof.

Figure 4:
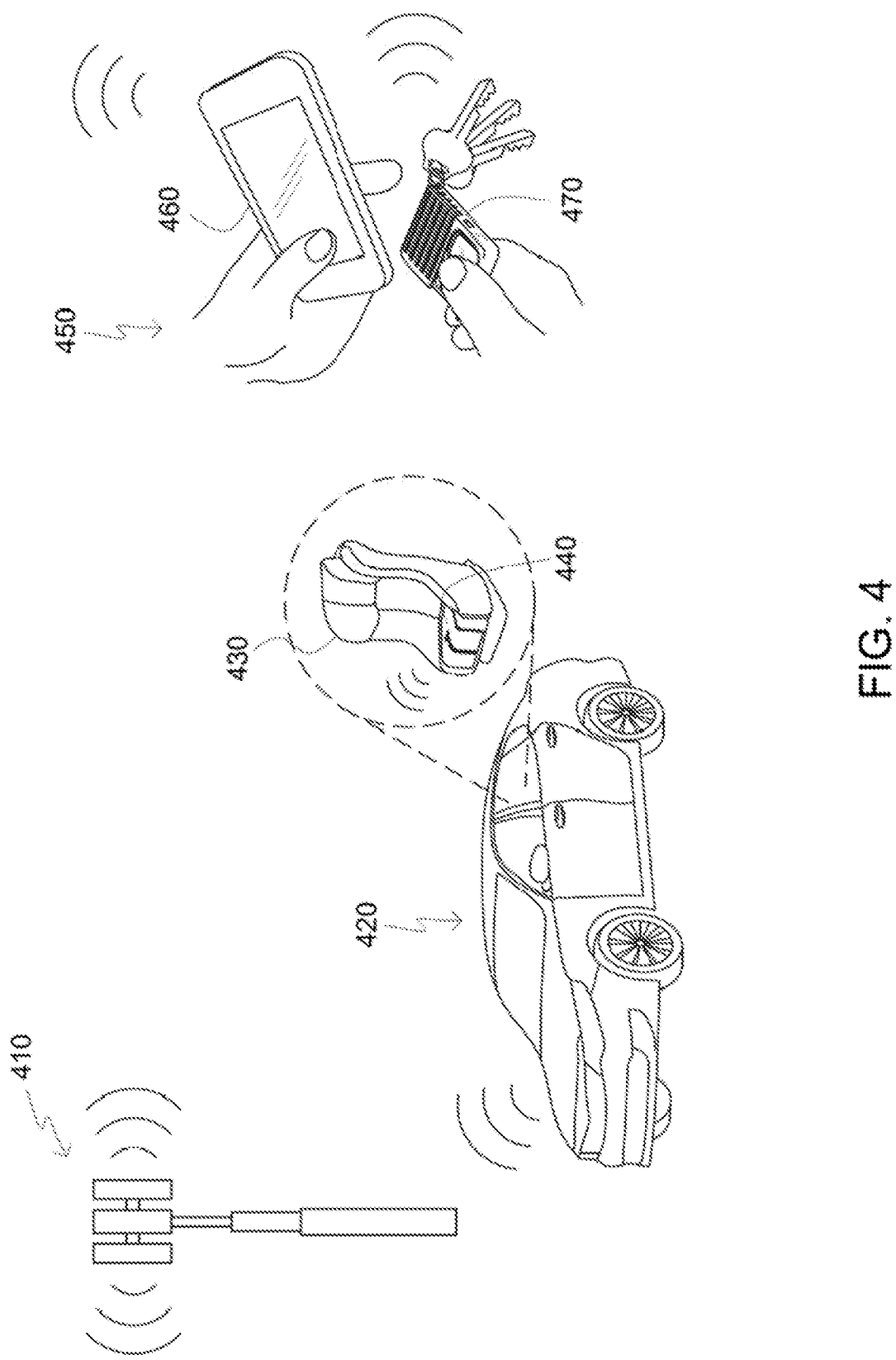
FIG. 4 illustrates local units of a system for protecting vehicle occupants, according to one embodiment of the invention.

FIG. 4 illustrates local units of a system for protecting vehicle occupants, according to one embodiment of the invention. There is shown a communication tower 410 (e.g. cellular network tower), a vehicle 420, a car seat 430 inside the vehicle with a seat pad 440 thereon, and a driver 450 having a portable computing device 460 and a key fob 470.

The illustrated communication tower 410 represents one or more communication devices dispersed over an area where the vehicle may be present, such as but not limited to WiFi hotspots, cellular communication towers, communication satellites, radio towers, and the like and combinations thereof. Accordingly, the local units may be in communication with one or more centralized system management modules while driving in various locations.

The illustrated vehicle 420 includes a child safety seat (car seat) 430 having an electronic seat pad 440 disposed thereon. The illustrated vehicle also includes the capacity for wireless communication over a network via the communication tower 410. The seat pad 440 also includes communication capabilities with one or more of the vehicle 420, the communication tower 410, the key-fob 470, o the smartphone 460. The seat pad 440 collects data related to the presence of an occupant within the vehicle.

The illustrated driver 450 is holding a smartphone 460 and a key-fob 470 to which keys are attached. The smartphone 460 and key-fob 470 each include communication devices that allow for wireless communication one or more other components of the system. The smartphone includes a driver sensor control module that collects data related to the position of a driver's portable electronic computing device relative to the vehicle and may also be a first remote notification device that receives alert status notifications and that issues an alert if it receives an alert notification and issues an alert if it does not receive an expected threshold of safety notifications. The key-fob 470 includes a key-location sensor that collects data related to the position of a driver's keys relative to the vehicle and may also be a first remote notification device that receives alert status notifications and that issues an alert if it receives an alert notification and issues an alert if it does not receive an expected threshold of safety notifications. The illustrated driver 450 is leaving the vicinity of the vehicle and once a threshold distance/signal strength is reached, the system will register the driver as being not proximate the vehicle.

FIG. 5 illustrates a perspective view of a keychain fob, according to one embodiment of the invention. There is shown an electronic key fob 470 including a housing 550 which houses a communication button 510 that operates a communication module, a safe button 540, a not safe button 560, a speaker 520, a microphone 570, and a ring 530 to couple to a keychain, set of keys, or ignition/entry token(s).

The illustrated communication button 510 is functionally coupled to a wireless communication device (e.g. two-way radio, Bluetooth audio communication device, intercom) and thereby allows for the user to activate a communication channel between the key-fob 470 and one or more components of the system, including but not limited to the smartphone, the system management module, and/or the vehicle itself in order to have one-way or two-way communication therewith. As a non-limiting example, the user could communicate thereby with someone inside the vehicle (e.g. to comfort a child).

The illustrated safe button 540 allows a user to send a safe signal to the system control module and/or the smartphone application and may be used by the driver to override a false alert status. The safe button is functionally coupled to a hardware and/or software device that automatically generates and transmits a safe override signal. The safe button may require a specific kind of application and/or combination so that a safe override signal is not accidentally sent. There may be one or more physical devices/structures (e.g. button cover, button lock) that prevent one from accidentally pressing the button.

The illustrated not-safe button 560 allows a user to send an alert override signal to the system control module and/or the smartphone application and may be used by the driver to override a false safe status. The not-safe button is functionally coupled to a hardware and/or software device that automatically generates and transmits an alert override signal. The not-safe button may require a specific kind of application and/or combination so that an alert override signal is not accidentally sent. There may be one or more physical devices/structures (e.g. button cover, button lock) that prevent one from accidentally pressing the button.

The illustrated speaker 520 and microphone 570 are functionally coupled to each other and to a communication device within the key-fob such that two-way communication and audio signals may be sent/received and produced locally, thereby enabling warning noise and intercom features thereof.

FIG. 6 illustrates a perspective view of a seat pad, according to one embodiment of the invention. There is shown an electronic seat pad 440 having a communication and control device 630, a sensor 610, and an electronically activated cooling device 640, all disposed on a thin pad of flexible material 620.

The illustrated communication and control device 630 includes hardware circuitry for wireless and/or wired communication within the electronic seat pad and to one or more components of the described system and that provides control of the operation of the seat pad. There may be operating software resident therein which also facilitates the same. There may be one or more transponders, emitters, buses, processors, data storage devices, and the like a combinations thereof.

The illustrated sensor 610 detects information related to the presence or absence of an occupant of the vehicle. Such may be as simple as a pressure transducer that provides a signal based on pressure experienced by the sensor, thereby determining if there is a weight (i.e. the occupant of the car seat) on the sensor or not. It may be more complicated, as an array of sensors of varying types (e.g. IR, temperature, $CO_2$, pressure, sound) that are automatically analyzed together and/or in conjunction with other sensor data to determine the presence, condition, state, and, etc. of the occupant and the vehicle itself.

The illustrated electronically activated cooling device 640 produces temperature reduction in the area immediately surrounding itself with activated by the communication and control module 630. The device may be electrically powered and/or chemically powered (or powered in some other manner). As a non-limiting example, there may be a battery coupled to a thermoelectric plate with the cooling side of the plate facing the expected location of an infant (i.e. facing upwards) such that the plate cools the bottom of the child while sending heat into the car seat. In another non-limiting example, the device is an instant cold pack that is electronically activated such that when activated a barrier between the activating chemicals (often water and ammonium nitrate, calcium ammonium nitrate, or urea) is automatically removed/perforated/punctured/broken/torn/cut by a device (e.g. servo operated cutting/puncturing tool) so that the materials may mix and produce an endothermic reaction, thereby absorbing heat from the immediate environment.

In another embodiment, there may be a device for protecting an occupant of a vehicle, that may include one or more of: an occupant detection sensor that detects the presence of an occupant; a key proximity detection sensor that detects the proximity of a vehicle key; a communication device that communicates with a portable electronic device of a driver of the vehicle; an alert determination module that determines if an alert status is present based on whether or not there is an occupant present and whether either of the vehicle key or the portable electronic device of the driver of the vehicle are present; and/or an alert action device that automatically activates if an alert status is present.

It may be that the alert action device is selected from the group of devices consisting of: an electronically activated cooling device, and an alarm sounding device.

FIGS. 7-10 together illustrate a state logic diagram showing determination of safe/alert states, according to one embodiment of the invention. There is shown a smart phone based data collection source 710, a user fob data collection source 720, a baby sensor data collection source 730, a driver sensor data collection source 740 all in communication with a smartphone application 750. There is also shown a smartphone geographic location application 760 in communication with a cloud server 770.

The illustrated smart phone source 710 provides data to the system regarding the location of the smartphone device with respect to the vehicle and/or electronic seat pad and also provides a user interface over which a user thereof may receive and send various signals relating to operation of the system, such as but not limited to sending or more "safe" signals, override signals, and/or receiving alarms and state notifications/messages. The smartphone source includes a smartphone application which may receive information, transmit information, pass-along information and/or analyze information from one or more components of the system.

The illustrated user fob source 720 provides information to the system regarding the location of the fob device with respect to the vehicle and/or electronic seat pad and also provides a user interface over which a user thereof may receive and send various signals relating to operation of the system, such as but not limited to sending or more "safe" signals, override signals, and/or receiving alarms and state notifications/messages.

The illustrated baby sensor source 730 provides information to the system regarding whether or not the vehicle is occupied by a child (or other occupant whose safety is of particular concern to the system) or not. It may also serve as a "center point" for measuring the location of one or more of a smartphone device and/or a key-fob device.

The illustrated driver sensor source 740 provides information to the system regarding whether or not the vehicle is occupied by a driver or not. It may also serve as a "center point" for measuring the location of one or more of a smartphone device and/or a key-fob device.

The illustrated smartphone application 750 may include one or more portions of a system management module (which may be distributed over a plurality of devices, e.g. a smartphone and a remote server, with some functionality being redundant for safety purposes) operating on a computing device having a processor and network communication hardware in communication with the communication system over a computerized network. The illustrated smartphone application receives data collected from each of the electronic seat pad (may be a component of the baby sensors), the driver sensor control module (may be a component of the driver sensor source), and the key-location sensor (may be a component of the user fob source). The smartphone application includes instructions for determining an alert status using the processor based on data collected from each of the electronic seat pad, the driver sensor control module, and the key-location sensor; and instructions for sending alert notifications and safety notifications to the first remote notification device over the computerized network via the communication hardware based on the alert status.

The illustrated smartphone geographic location application 760 forwards safe/not-safe signals from the smartphone application to a cloud server 770. Safe notifications include a periodic update on last known location for the smartphone device and/or the vehicle. Not-safe notifications may include similar or identical information. Information relating to loss-of signal between any of the components and each other and/or the local units and the cloud server are also transmitted as/when able. The system automatically records information, especially geographic information related to signal loss. The system automatically records information related to safe/not-safe override signals sent by the driver and/or other users and appends them to a user specific library which may be fed to the state library, to an AI system, or manually examined to upgrade the state library and/or other functional/analytical aspects of the system for the particular user and/or for other users.

The illustrated cloud server 770 receives, stores, analyzes, and manages data from the local units and sends alert/safety messages to remote notification devices as needed. The cloud server stores historical usage information and data points, and especially links the same with override information so that patterns of use can be analyzed to improve/customize the system for particular users and/or sets of users (e.g. all users in a particular city where signal is consistently lost while driving through a particular tunnel). The cloud server sends a cascade of notifications to various remote notification devices according to a predefined scripts. A non-limiting exemplary script is as follows:

First notification: driver smartphone application
Second notification: secondary smartphone application (e.g. spouse not currently driving)
Tertiary notification: simultaneous notification by email of all users on the account
Final notification: emergency services (e.g. police, ambulance)

FIG. 11 is a state chart of a system for protecting occupants of a vehicle, according to one embodiment of the invention. The first column identifies various states as indicated by received data. The second column is marked if that state causes the system to arm itself, thereby activating and allowing for the various alarm or alarm off states. The third column indicates if the state triggers an alarm. The fourth column identifies if the state causes an alarm to turn off.

Figure 12:
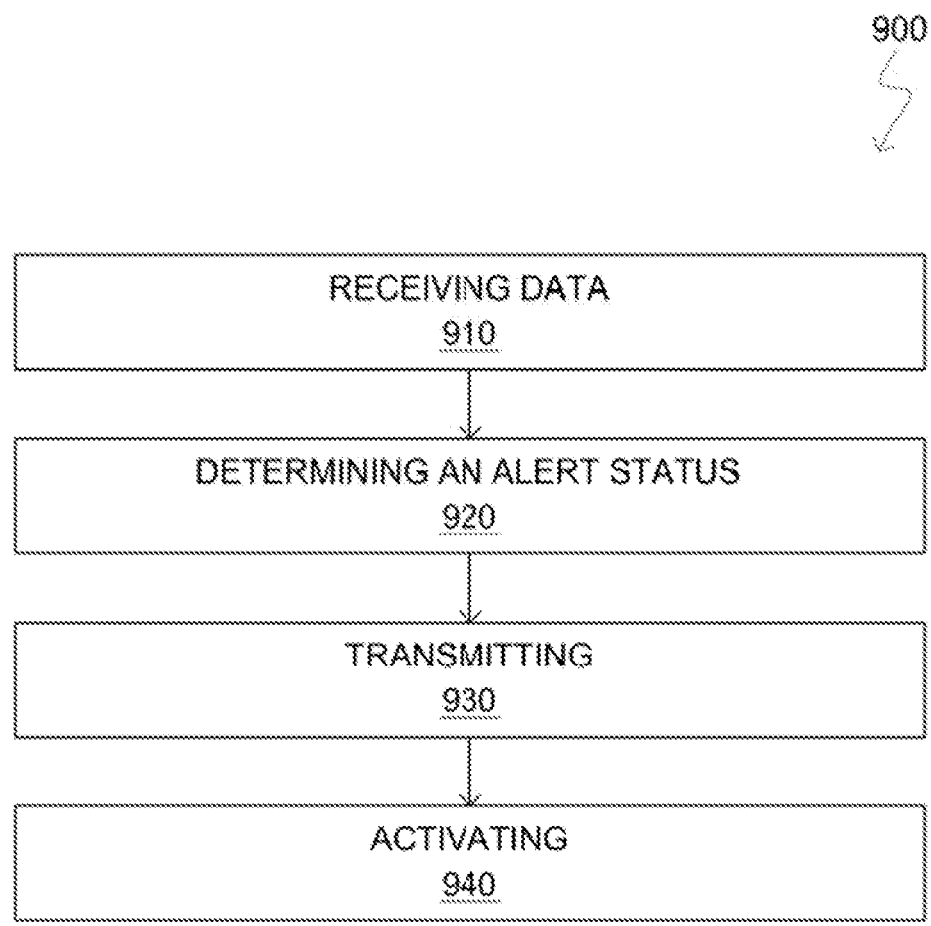
FIG. 12 is a flow diagram showing a method of protecting an occupant of a vehicle, according to one embodiment of the invention.

FIG. 12 is a flow diagram 900 showing a method of protecting an occupant of a vehicle, according to one embodiment of the invention. There is shown a step of receiving data 910 followed by determining an alert status 920 followed by a step of transmitting 930 an alert notification or a safety notification followed by a step of activating an alert message on a notification device 940.

The step of receiving data 910 may include one or more of: receiving occupancy data from an electronic seat pad present within the vehicle; receiving first proximity data from a driver sensor control module that detects whether a portable electronic device of a driver of the vehicle is present with the vehicle or not; receiving second proximity data from a key-location sensor that detects whether keys of the vehicle are present with the vehicle or not; receiving additional data from one or more additional sensors; receiving geographic data relating to a location of a vehicle; receiving demographic data relating to an occupant and/or driver; receiving condition data relating to an occupant and/or a driver; and the like and combinations thereof. The data may be received over a computerized network. The data may be stored in a data storage device. The data may be converted, collated, recorded, structured, or otherwise manipulated to a suitable form for analysis.

The step of determining an alert status 920 may be accomplished by operation of a processer based on occupancy data, first proximity data, second proximity data, and/or any other data received. The alert status may be determined by consulting one or more records of a state library and/or following one or more portions of programmable logic that are predefined to produce alert and/or safety states.

It may be that the step of determining an alert status using the processor based on data collected from each of the electronic seat pad, the driver sensor control module, and the key-location sensor is based on instructions for generating an alert notification in each of the following cases wherein the data infers that the:

a. occupant is present, the keys are not present, and the driver's portable electronic device is not present;

b. occupant is present, the keys are present, and the driver's portable electronic device is not present; and c. occupant is present, the keys are not present, and the driver's portable electronic device is present.

The step of transmitting 930 may include automatically transmitting an electronic message of an alert status to one or more remote notification devices, either together or in series in time, the electronic message may either including an alert notification or a safety notification (or some other combination of message types designed to provide information about the safety of the occupant).

The step of activating 940 may include automatically activating an alert message on the remote notification device in response to an alert notification and/or automatically activating an alert message on the remote notification device in response to a lack of safety notifications.

Other steps may include: automatically transmitting an electronic message of the alert status to a second remote device if no response is received from the first remote device; automatically activating an electronically activated cooling device within the vehicle in response to either an alert notification or a lack of safety notifications; updating instructions for determining an alert status based on custom alert status instructions customized for a location of the vehicle; updating instructions for determining an alert status based on custom alert status instructions customized for a demographic characteristic of a driver of the vehicle; updating instructions for determining an alert status based on custom alert status instructions customized for a demographic characteristic of the occupant; and/or automatically tracking a last known location of the vehicle and automatically transmitting the last known location of the vehicle in association with an alert notification.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For example, although the illustrated seat pad is portable, it may be integral to the seat, there may be multiple pads, the pressure sensor may be a flexible pressure sensor, the seat pad may be water-proof (e.g. silicon and other elastomerics). In another non-limiting embodiment, there is a flex sensor that senses a change in impedance/resistance anywhere along the length of the sensor due to minute flex/position/shape changes, including those of a sleeping baby (e.g. a goniometer or flexible potentiometer). Thus, if the sensor impedance/resistance changes and continues to change, there is a moving object on the pad. If the impedance/resistance changes, but does NOT continue to change, then an inanimate object has been placed in the seat, ie a grocery bag. If the impedance/resistance does not change or changes very slowly then there in nothing on the seat. Therefore, the seat pad has simple change logic built into the communication, wherein multiple changes over time=communicate as occupied, single change or slow change=communicate as not occupied. There may also be a flex sensor in a seatbelt of a driver within the vehicle that provides information to the system relative to whether the driver is in the car or not.

Further, with respect to the key fob, for cars with keyless operation, it might not be keys that are attached (it would be whatever device/token/etc. is needed for operation of the vehicle. The key fob may include on/off buttons and/or blue-tooth communication capabilities. The key fob may be shaped as a card. There may be a button to set off alarm of the car and/or lock/unlock car. The fob may include an intercom to speak to someone in the car. The fob may be an implant or some other token for the ODB communication system of the car.

Still more, the smart-phone application may be resident on a tablet, pc, or other computing device. There may be multiple applications working together instead of a single application. There may be one or more accounts on such for multiple users and there may be a tiered-user system where a master account grants permissions and sets settings for sub-accounts. There may be an intercom from the phone to a speaker in car.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims. Further, it is contemplated that an embodiment may be limited to consist of or to consist essentially of one or more of the features, functions, structures, methods described herein.

What is claimed is:

1. A system for protecting a vehicle occupant over a computerized network, comprising:

a. an electronic seat pad including an occupant sensor that collects data related to the presence of an occupant within the vehicle;

b. a driver sensor control module that collects data related to the position of a driver's portable electronic computing device relative to the vehicle;

c. a key-location sensor that collects data related to the position of a driver's keys relative to the vehicle;

d. a first remote notification device that receives alert status notifications and that issues an alert if it receives an alert notification and issues an alert if it does not receive an expected threshold of safety notifications;

e. a communication system in communication with each of the electronic seat pad, the driver sensor control module, and the key-location sensor that receives and transmits collected data from each thereof; and f. a system management module operating on a computing device having a processor and network communication hardware in communication with the communication system over the computerized network that receives data collected from each of the electronic seat pad, the driver sensor control module, and the key-location sensor, including:

i. instructions for determining an alert status using the processor based on data collected from each of the electronic seat pad, the driver sensor control module, and the key-location sensor; and ii. instructions for sending alert notifications and safety notifications to the first remote notification device over the computerized network via the communication hardware based on the alert status; and iii. an AI module, in data communication with each of the electronic seat pad, the driver sensor control module, the key-location sensor, and the first remote communication device such that the AI module collects data regarding alert status and sensor data.

2. The system of claim 1, further comprising a state library in communication with a logic subscription module wherein updated alert conditions are automatically provided over time such that the instructions for determining an alert status may change over time, and wherein the AI module makes recommendations as to additional state records for the state library.

3. The system of claim 1, wherein the AI module includes a learning module functionally coupled to the state library such that the learning module receives updates of location based information.

4. The system of claim 1, wherein the key-location sensor is housed within a key-fob to which keys are attached.

5. The system of claim 4, wherein the key-fob includes a microphone functionally coupled to a speaker in the vehicle such that a user of the key-fob can send a verbal message to an interior of the vehicle.

6. The system of claim 2, wherein the AI module receives feedback from users and suggests solutions based on the feedback from users.

7. The system of claim 1, wherein the driver sensor control module determines proximity to the vehicle by whether or not a limited range wireless connection to an electronic device associated with the vehicle is active or not active.

8. The system of claim 1, further comprising a second remote notification device and wherein the system management module includes instructions for notifying the second remote notification device if no response is received from the first remote notification device in response to an alert notification.

9. The system of claim 1, wherein the key-location sensor determines proximity to the vehicle by whether or not a limited range wireless connection to an electronic device associated with the vehicle is active or not active.

10. The system of claim 1, wherein the instructions for determining an alert status using the processor based on data collected from each of the electronic seat pad, the driver sensor control module, and the key-location sensor include instructions for generating an alert notification in each of the following cases wherein the data infers that the:
   a. occupant is present, the keys are not present, and the driver's portable electronic device is not present;
   b. occupant is present, the keys are present, and the driver's portable electronic device is not present; and
   c. occupant is present, the keys are not present, and the driver's portable electronic device is present.

11. A method of protecting an occupant of a vehicle using a computing system over a computerized network, comprising the steps of:
   a. receiving occupancy data from an electronic seat pad present within the vehicle;
   b. receiving first proximity data from a driver sensor control module that detects whether a portable electronic device of a driver of the vehicle is present with the vehicle or not;
   c. receiving second proximity data from a key-location sensor that detects whether keys of the vehicle are present with the vehicle or not;
   d. determining an alert status based on occupancy data, first proximity data, and second proximity data using a processor of the computing system;
   e. automatically transmitting an electronic message of the alert status to a first remote notification device, the electronic message either including an alert notification or a safety notification;
   f. automatically activating an alert message on the remote notification device in response to an alert notification;
   g. automatically activating an alert message on the remote notification device in response to a lack of safety notifications; and
   h. collecting data regarding alert status and sensor data into an AI module.

12. The method of claim 11, further comprising the step of automatically transmitting an electronic message of the alert status to a second remote device if no response is received from the first remote device.

13. The method of claim 11, wherein the step of determining an alert status using the processor based on data collected from each of the electronic seat pad, the driver sensor control module, and the key-location sensor is based on instructions for generating an alert notification in each of the following cases wherein the data infers that the:
   a. occupant is present, the keys are not present, and the driver's portable electronic device is not present;
   b. occupant is present, the keys are present, and the driver's portable electronic device is not present; and
   c. occupant is present, the keys are not present, and the driver's portable electronic device is present.

14. The method of claim 11, further comprising the step of automatically activating an electronically activated cooling device within the vehicle in response to either an alert notification or a lack of safety notifications.

15. The method of claim 11, further comprising the step of updating instructions for determining an alert status based on custom alert status instructions customized for a location of the vehicle.

16. The method of claim 11, further comprising the step of updating instructions for determining an alert status based on custom alert status instructions customized for a demographic characteristic of a driver of the vehicle.

17. The method of claim 11, further comprising the step of updating instructions for determining an alert status based on custom alert status instructions customized for a demographic characteristic of the occupant.

18. The method of claim 11, further comprising the step of automatically tracking a last known location of the vehicle and automatically transmitting the last known location of the vehicle in association with an alert notification.

19. A device for protecting an occupant of a vehicle, comprising:
   a. an occupant detection sensor that detects the presence of an occupant;
   b. a key proximity detection sensor that detects the proximity of a vehicle key;
   c. a communication device that communicates with a portable electronic device of a driver of the vehicle;
   d. an alert determination module that determines if an alert status is present based on whether or not there is an occupant present and whether either of the vehicle key or the portable electronic device of the driver of the vehicle are present;
   e. an alert action device that automatically activates if an alert status is present;
   f. an AI module that collects data regarding alert status and sensor data, that receives feedback from users and suggests solutions based on the feedback from users, and that includes a learning module that receives updates of location based information; and
   g. a state library module that communicates with the AI module and provides updated alert conditions and instructions for determining alert status.

20. The device of claim 19, wherein the alert action device is selected from the group of devices consisting of: an electronically activated cooling device, and an alarm sounding device.

* * * * *